United States Patent
Khadiwala et al.

(10) Patent No.: US 12,166,822 B2
(45) Date of Patent: Dec. 10, 2024

(54) PERFORMANCE IMPACT INFORMATION FOR ADJUSTING RATE OF A DATA RECONSTRUCTION OPERATION

(71) Applicant: Pure Storage, Inc., Mountain View, CA (US)

(72) Inventors: Ravi V. Khadiwala, Bartlett, IL (US); Asimuddin Kazi, Naperville, IL (US)

(73) Assignee: Pure Storage, Inc., Santa Clara, CA (US)

( * ) Notice: Subject to any disclaimer, the term of this patent is extended or adjusted under 35 U.S.C. 154(b) by 0 days.

(21) Appl. No.: 18/169,340

(22) Filed: Feb. 15, 2023

(65) Prior Publication Data

US 2023/0199067 A1    Jun. 22, 2023

Related U.S. Application Data

(63) Continuation of application No. 16/862,171, filed on Apr. 29, 2020, now Pat. No. 11,588,892, which is a
(Continued)

(51) Int. Cl.
*G06F 11/14* (2006.01)
*G06F 3/06* (2006.01)
(Continued)

(52) U.S. Cl.
CPC ........ *H04L 67/1097* (2013.01); *G06F 3/0604* (2013.01); *G06F 3/061* (2013.01);
(Continued)

(58) Field of Classification Search
CPC ..... H04L 67/1097; H04L 67/10; G06F 16/10; G06F 3/0604; G06F 3/061; G06F 3/0614;
(Continued)

(56) References Cited

U.S. PATENT DOCUMENTS

| 4,092,732 A | 5/1978 | Ouchi |
| 5,454,101 A | 9/1995 | Mackay |

(Continued)

OTHER PUBLICATIONS

Chung; An Automatic Data Segmentation Method for 3D Measured Data Points; National Taiwan University; pp. 1-8; 1998.
(Continued)

*Primary Examiner* — Mark A Giardino, Jr.
(74) *Attorney, Agent, or Firm* — Garlick & Markison; Timothy D. Taylor

(57) ABSTRACT

A method for execution by one or more computing devices of a storage network includes obtaining performance impact information regarding a data reconstruction operation associated with a computing device of the one or more computing devices, where the data reconstruction operation is regarding reconstructing data at a first reconstruction rate of a plurality of reconstruction rates, and where the performance impact information includes performance metrics of the storage network affected by the data reconstruction operation. The method further includes determining a second reconstruction rate of the plurality of reconstruction rates to utilize for the data reconstruction operation based on the performance impact information to achieve a first performance metric of the performance metrics. The method further includes executing the data reconstruction operation in accordance with the second reconstruction rate.

20 Claims, 9 Drawing Sheets

Related U.S. Application Data continuation of application No. 15/823,931, filed on Nov. 28, 2017, now Pat. No. 10,681,134, which is a continuation-in-part of application No. 14/287,534, filed on May 27, 2014, now Pat. No. 9,894,157.

(60) Provisional application No. 61/860,456, filed on Jul. 31, 2013.

(51) Int. Cl.
| | |
|---|---|
| *G06F 9/48* | (2006.01) |
| *G06F 9/50* | (2006.01) |
| *G06F 11/07* | (2006.01) |
| *G06F 11/10* | (2006.01) |
| *G06F 16/10* | (2019.01) |
| *H04L 67/10* | (2022.01) |
| *H04L 67/1097* | (2022.01) |

(52) U.S. Cl.
CPC .......... *G06F 3/0614* (2013.01); *G06F 3/0619* (2013.01); *G06F 3/0632* (2013.01); *G06F 3/0646* (2013.01); *G06F 3/065* (2013.01); *G06F 3/0653* (2013.01); *G06F 3/0668* (2013.01); *G06F 3/067* (2013.01); *G06F 3/0683* (2013.01); *G06F 3/0689* (2013.01); *G06F 9/4881* (2013.01); *G06F 9/5066* (2013.01); *G06F 11/07* (2013.01); *G06F 11/1076* (2013.01); *G06F 11/1092* (2013.01); *G06F 11/1448* (2013.01); *G06F 11/1458* (2013.01); *G06F 16/10* (2019.01); *H04L 67/10* (2013.01); *G06F 2209/5017* (2013.01); *G06F 2211/1028* (2013.01)

(58) Field of Classification Search
CPC .... G06F 3/0619; G06F 3/0632; G06F 3/0646; G06F 3/065; G06F 3/0653; G06F 3/0668; G06F 3/067; G06F 3/0683; G06F 3/0689; G06F 9/4881; G06F 9/5066; G06F 11/07; G06F 11/076; G06F 11/1092; G06F 11/1448; G06F 11/1458; G06F 2209/5017; G06F 2211/1028
See application file for complete search history.

(56) References Cited

U.S. PATENT DOCUMENTS

| | | |
|---|---|---|
| 5,485,474 A | 1/1996 | Rabin |
| 5,774,643 A | 6/1998 | Lubbers |
| 5,802,364 A | 9/1998 | Senator |
| 5,809,285 A | 9/1998 | Hilland |
| 5,890,156 A | 3/1999 | Rekieta |
| 5,987,622 A | 11/1999 | Lo Verso |
| 5,991,414 A | 11/1999 | Garay |
| 6,012,159 A | 1/2000 | Fischer |
| 6,058,454 A | 5/2000 | Gerlach |
| 6,128,277 A | 10/2000 | Bruck |
| 6,175,571 B1 | 1/2001 | Haddock |
| 6,192,472 B1 | 2/2001 | Garay |
| 6,256,688 B1 | 7/2001 | Suetaka |
| 6,272,658 B1 | 8/2001 | Steele |
| 6,301,604 B1 | 10/2001 | Nojima |
| 6,356,949 B1 | 3/2002 | Katsandres |
| 6,366,995 B1 | 4/2002 | Vilkov |
| 6,374,336 B1 | 4/2002 | Peters |
| 6,415,373 B1 | 7/2002 | Peters |
| 6,418,539 B1 | 7/2002 | Walker |
| 6,449,688 B1 | 9/2002 | Peters |
| 6,516,425 B1 | 2/2003 | Belhadj |
| 6,567,948 B2 | 5/2003 | Steele |
| 6,571,282 B1 | 5/2003 | Bowman-Amuah |
| 6,609,223 B1 | 8/2003 | Wolfgang |
| 6,718,361 B1 | 4/2004 | Basani |
| 6,760,808 B2 | 7/2004 | Peters |
| 6,785,768 B2 | 8/2004 | Peters |
| 6,785,783 B2 | 8/2004 | Buckland |
| 6,826,711 B2 | 11/2004 | Moulton |
| 6,879,596 B1 | 4/2005 | Dooply |
| 7,003,688 B1 | 2/2006 | Pittelkow |
| 7,024,451 B2 | 4/2006 | Jorgenson |
| 7,024,609 B2 | 4/2006 | Wolfgang |
| 7,080,101 B1 | 7/2006 | Watson |
| 7,103,824 B2 | 9/2006 | Halford |
| 7,103,915 B2 | 9/2006 | Redlich |
| 7,111,115 B2 | 9/2006 | Peters |
| 7,140,044 B2 | 11/2006 | Redlich |
| 7,146,644 B2 | 12/2006 | Redlich |
| 7,171,493 B2 | 1/2007 | Shu |
| 7,222,133 B1 | 5/2007 | Raipurkar |
| 7,240,236 B2 | 7/2007 | Cutts |
| 7,272,613 B2 | 9/2007 | Sim |
| 7,305,579 B2 | 12/2007 | Williams |
| 7,636,724 B2 | 12/2009 | De La Torre |
| 8,751,861 B2 * | 6/2014 | Nair ...................... G06F 3/0611 714/6.21 |
| 10,642,690 B1 | 5/2020 | Tian |
| 2002/0062422 A1 | 5/2002 | Butterworth |
| 2002/0166079 A1 | 11/2002 | Ulrich |
| 2003/0018927 A1 | 1/2003 | Gadir |
| 2003/0037261 A1 | 2/2003 | Meffert |
| 2003/0065617 A1 | 4/2003 | Watkins |
| 2003/0084020 A1 | 5/2003 | Shu |
| 2004/0024963 A1 | 2/2004 | Talagala |
| 2004/0122917 A1 | 6/2004 | Menon |
| 2004/0215998 A1 | 10/2004 | Buxton |
| 2004/0228493 A1 | 11/2004 | Ma |
| 2005/0100022 A1 | 5/2005 | Ramprashad |
| 2005/0114594 A1 | 5/2005 | Corbett |
| 2005/0125593 A1 | 6/2005 | Karpoff |
| 2005/0131993 A1 | 6/2005 | Fatula, Jr. |
| 2005/0132070 A1 | 6/2005 | Redlich |
| 2005/0144382 A1 | 6/2005 | Schmisseur |
| 2005/0229069 A1 | 10/2005 | Hassner |
| 2006/0047907 A1 | 3/2006 | Shiga |
| 2006/0136448 A1 | 6/2006 | Cialini |
| 2006/0156059 A1 | 7/2006 | Kitamura |
| 2006/0224603 A1 | 10/2006 | Correll, Jr. |
| 2007/0079081 A1 | 4/2007 | Gladwin |
| 2007/0079082 A1 | 4/2007 | Gladwin |
| 2007/0079083 A1 | 4/2007 | Gladwin |
| 2007/0088970 A1 | 4/2007 | Buxton |
| 2007/0174192 A1 | 7/2007 | Gladwin |
| 2007/0214285 A1 | 9/2007 | Au |
| 2007/0234110 A1 | 10/2007 | Soran |
| 2007/0283167 A1 | 12/2007 | Venters, III |
| 2009/0094251 A1 | 4/2009 | Gladwin |
| 2009/0094318 A1 | 4/2009 | Gladwin |
| 2010/0023524 A1 | 1/2010 | Gladwin |
| 2011/0185258 A1 | 7/2011 | Grube et al. |
| 2011/0264717 A1 | 10/2011 | Grube et al. |
| 2013/0031247 A1 | 1/2013 | Dhuse |
| 2013/0073900 A1 | 3/2013 | Li |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Bal-

(56) References Cited

OTHER PUBLICATIONS ancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

Zeilenga; Lightweight Directory Access Protocol (LDAP): Technical Specification Road Map; IETF Network Working Group; RFC 4510; Jun. 2006; pp. 1-8.

* cited by examiner

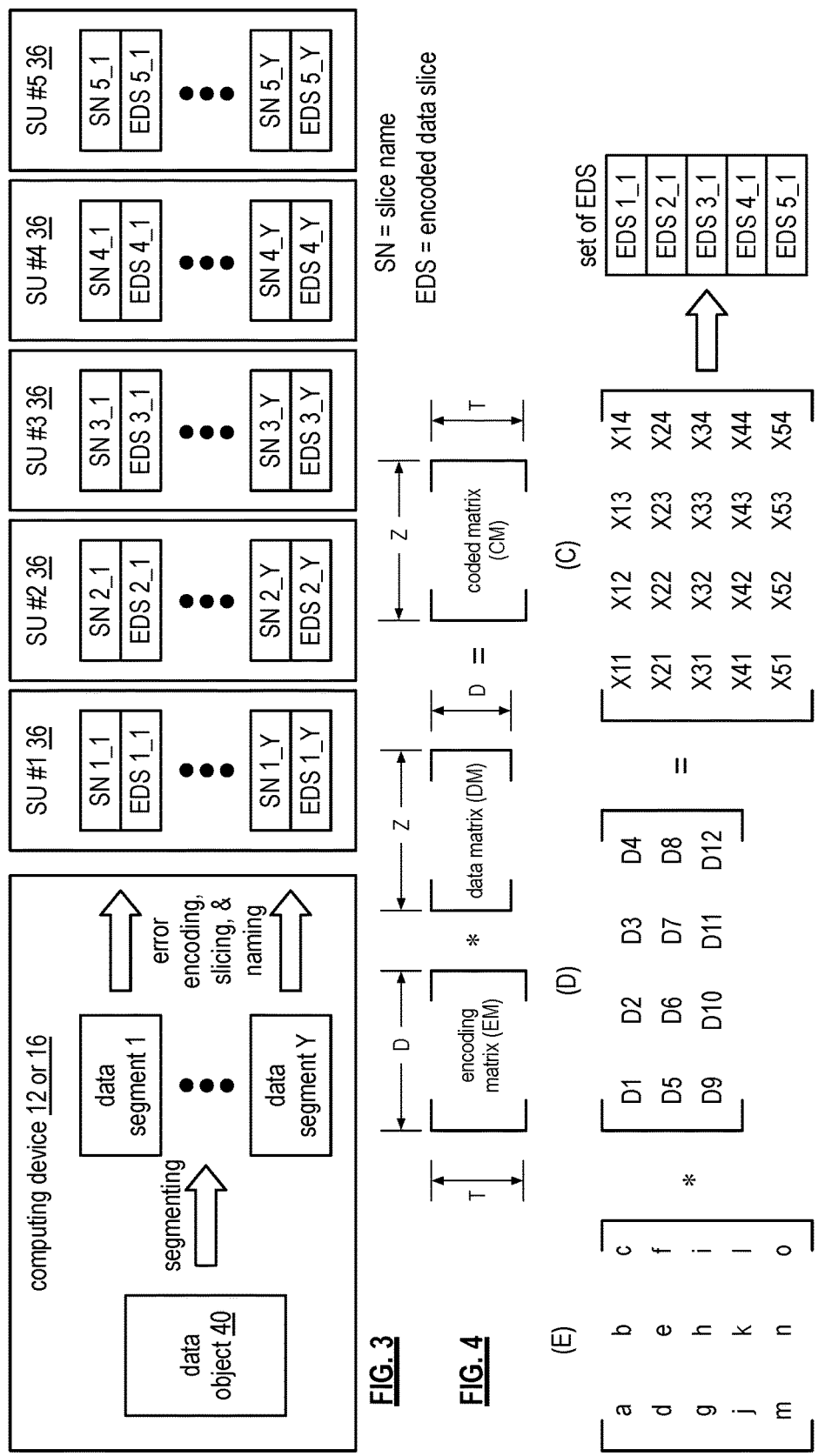

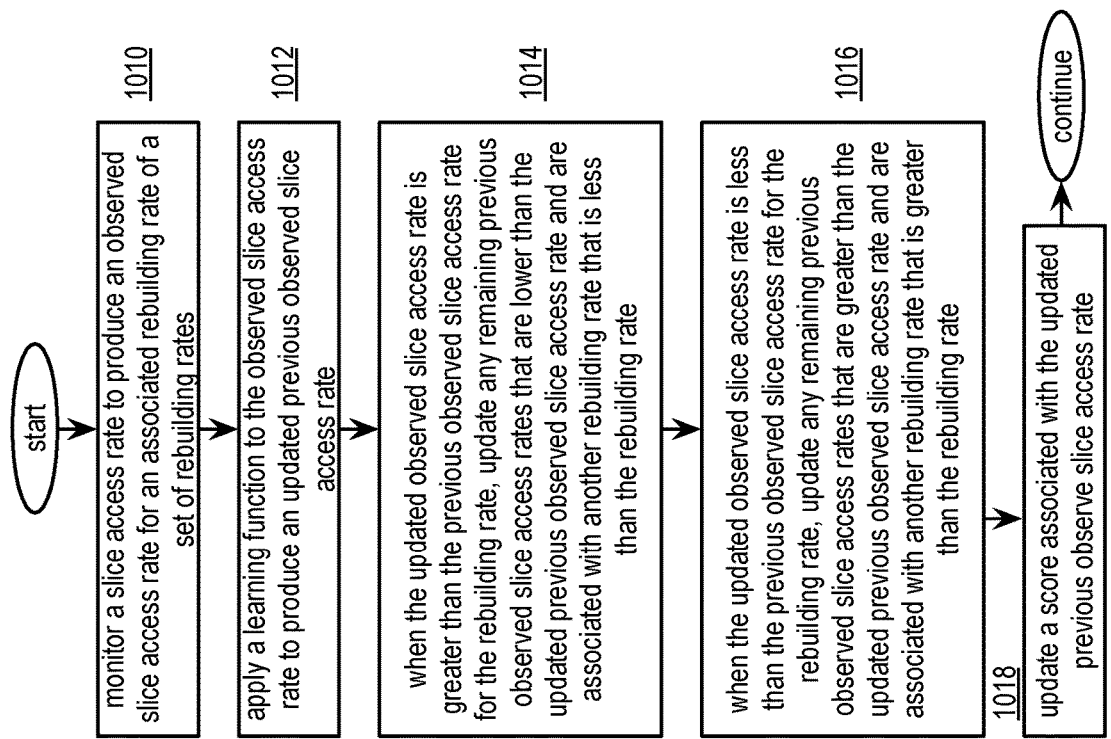

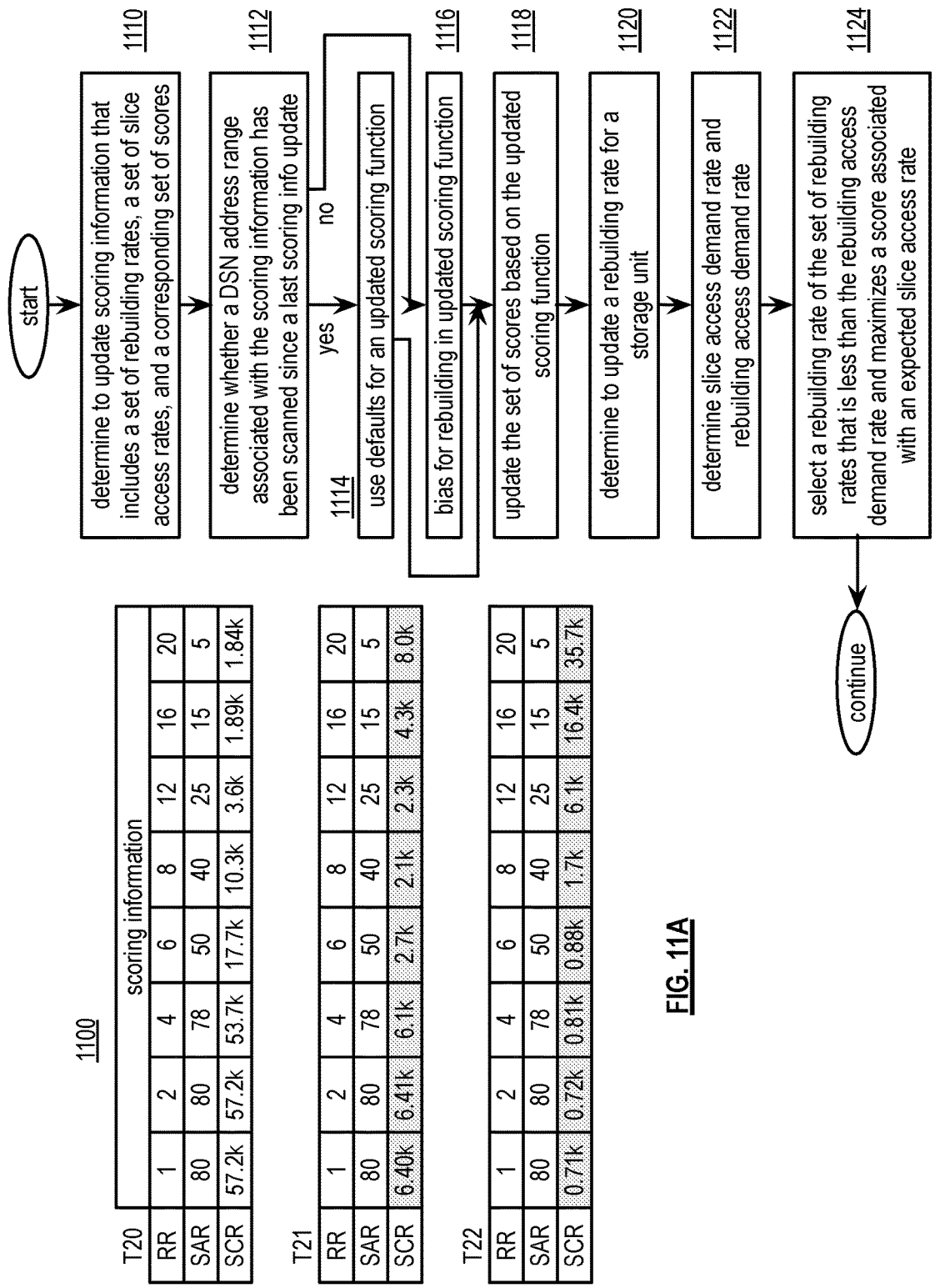

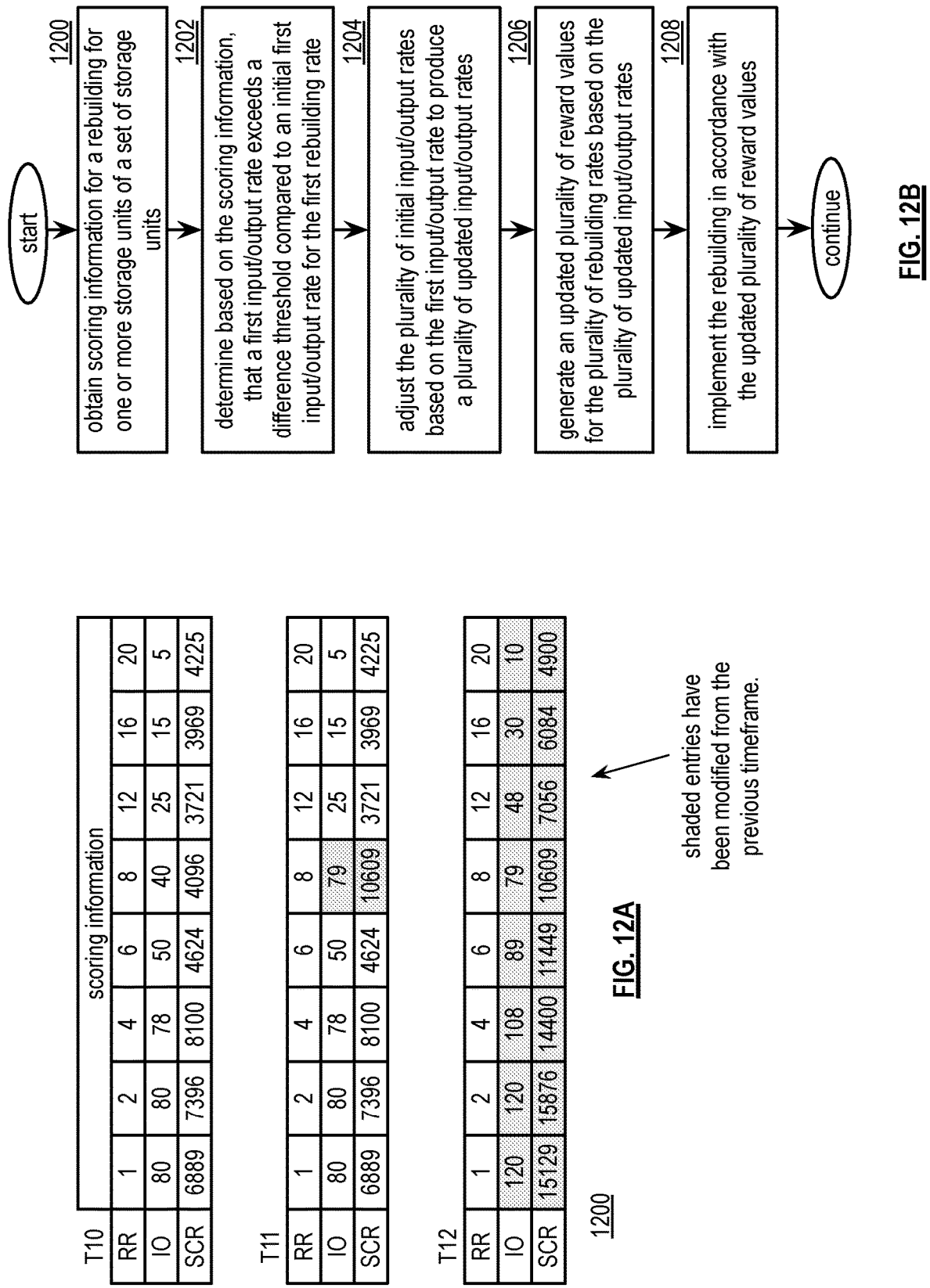

PERFORMANCE IMPACT INFORMATION FOR ADJUSTING RATE OF A DATA RECONSTRUCTION OPERATION

CROSS-REFERENCE TO RELATED APPLICATIONS

This application claims priority pursuant to 35 U.S.C. § 120 as a continuation of U.S. Utility application Ser. No. 16,862,171, entitled "Adaptive Rebuilding Of Encoded Data Slices In A Storage Network", filed Apr. 29, 2020, issuing on Feb. 21, 2023 as U.S. Pat. No. 11,588,892, which is a continuation of U.S. Utility application Ser. No. 15/823,931, entitled "Accelerated Learning In Adaptive Rebuilding By Applying Observations To Other Samples", filed Nov. 28, 2017, issued on Jun. 9, 2020 as U.S. Pat. No. 10,681,134, which is a continuation-in-part of U.S. Utility application Ser. No. 14/287,534, entitled "Distributed Storage Network With Client Subsets And Methods For Use Therewith", filed May 27, 2014, issued on Feb. 13, 2018 as U.S. Pat. No. 9,894,157, which claims priority pursuant to 35 U.S.C. § 119(e) to U.S. Provisional Application No. 61/860,456, entitled "Establishing A Slice Rebuilding Rate In A Dispersed Storage Network", filed Jul. 31, 2013, expired, all of which are hereby incorporated herein by reference in their entirety and made part of the present U.S. Utility patent application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networks and more particularly to rebuilding dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 10A is a diagram illustrating an example of modifying scoring information in accordance with the present invention;

FIG. 10B is a diagram illustrating another example of modifying scoring information in accordance with the present invention;

FIG. 10C is a flowchart illustrating an example of updating scoring information in accordance with the present invention;

FIG. 11A is a diagram illustrating another example of modifying scoring information in accordance with the present invention;

FIG. 11B is a flowchart illustrating another example of updating scoring information in accordance with the present invention;

FIG. 12A is a diagram illustrating another example of modifying scoring information in accordance with the present invention; and FIG. 12B is a flowchart illustrating another example of updating scoring information in accordance with the present invention.

DETAILED DESCRIPTION OF THE INVENTION

Figure 1:
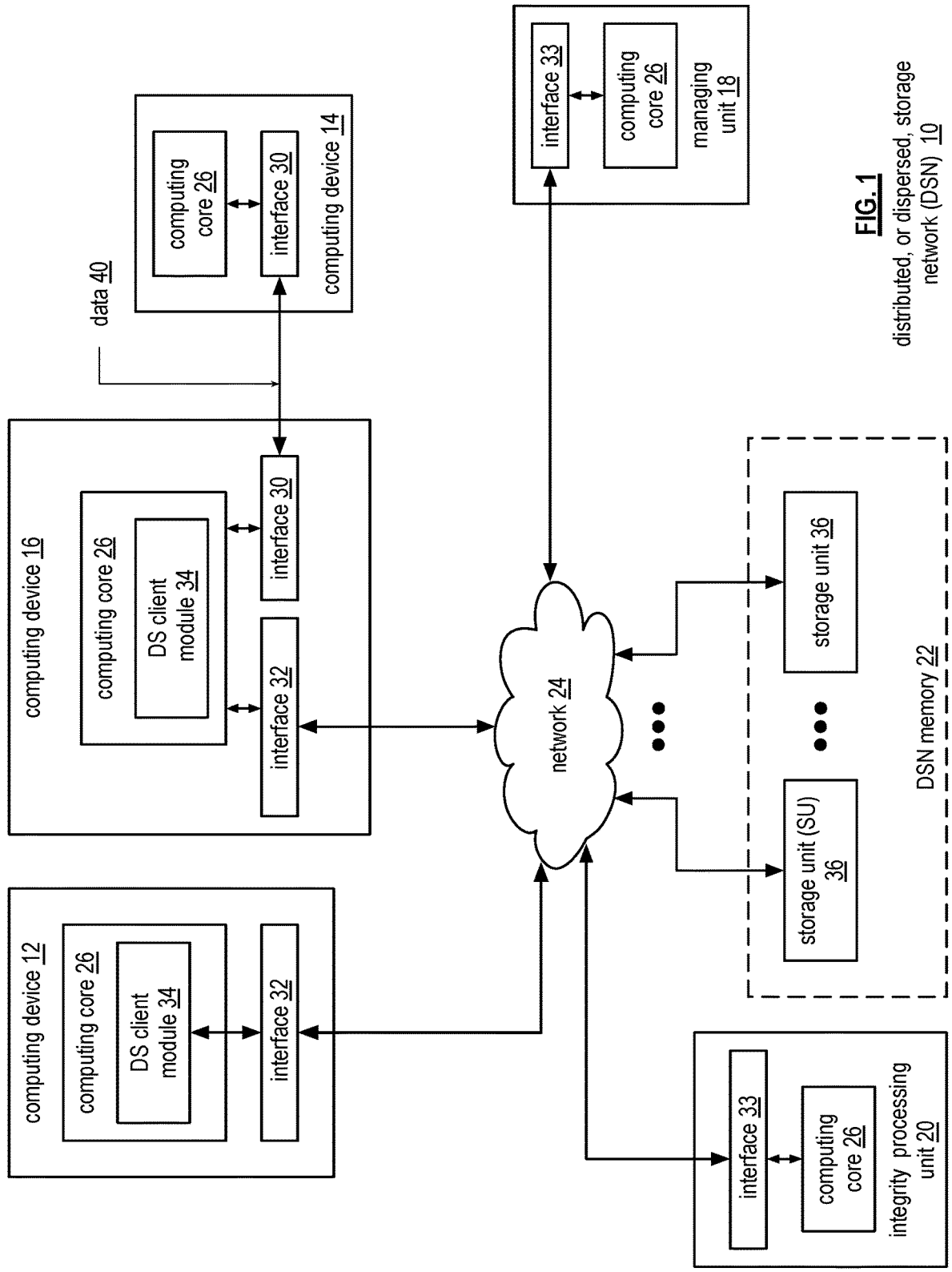
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
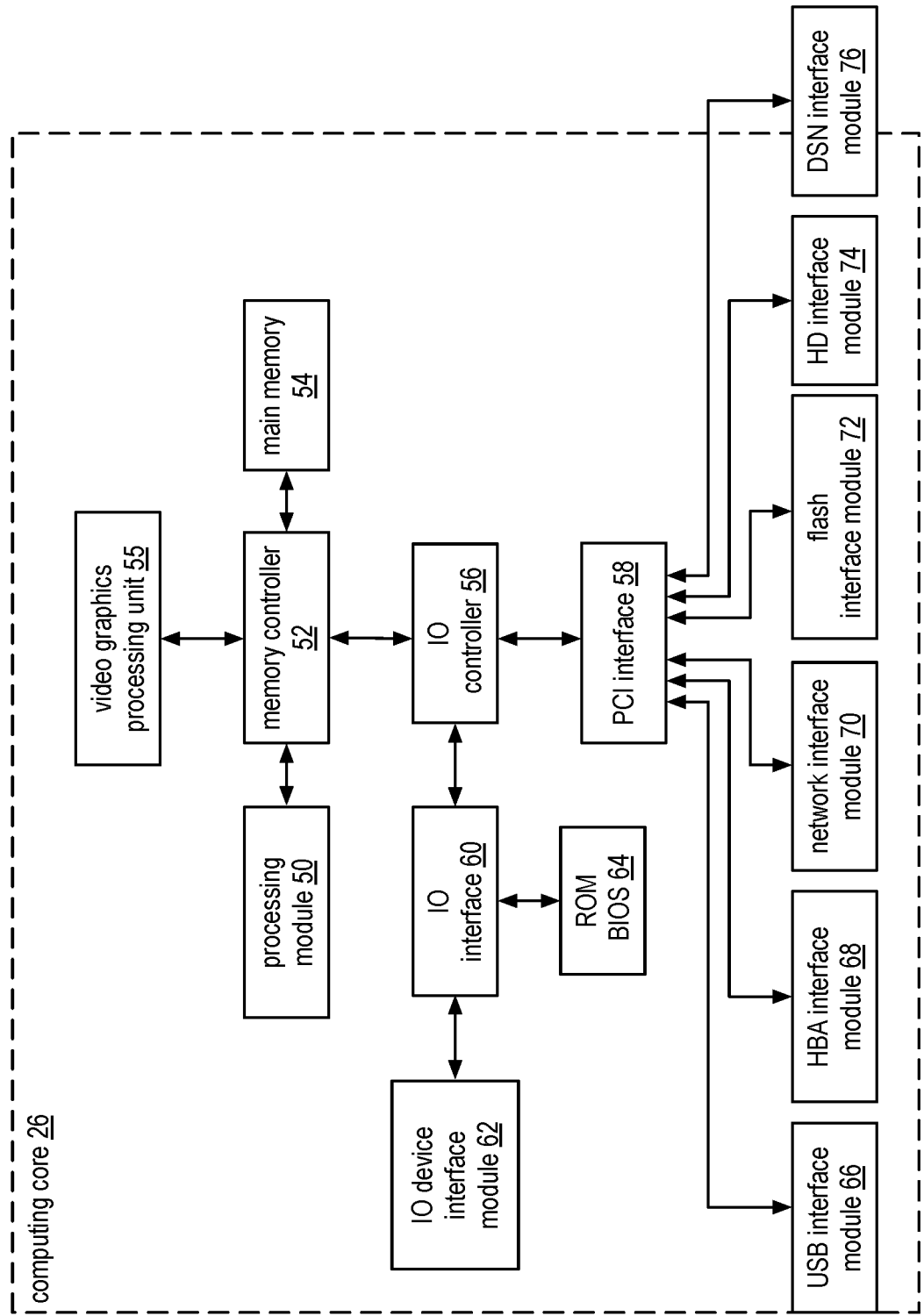
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data 40 as subsequently described with reference to one or more of FIGS. 3-8. In this example embodiment, computing device 16 functions as a dispersed storage processing agent for computing device 14. In this role, computing device 16 dispersed storage error encodes and decodes data (e.g., data 40) on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSTN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSTN managing unit 18 tracks the number of times a user accesses a non-public vault and/or public vaults, which can be used to generate a per-access billing information. In another instance, the DSTN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one 10 device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
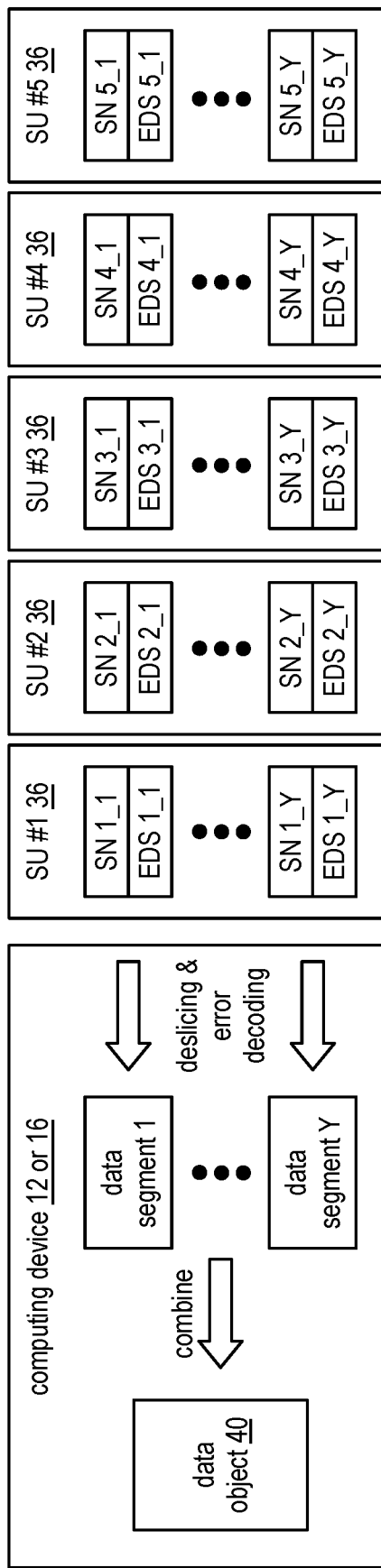
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9B:
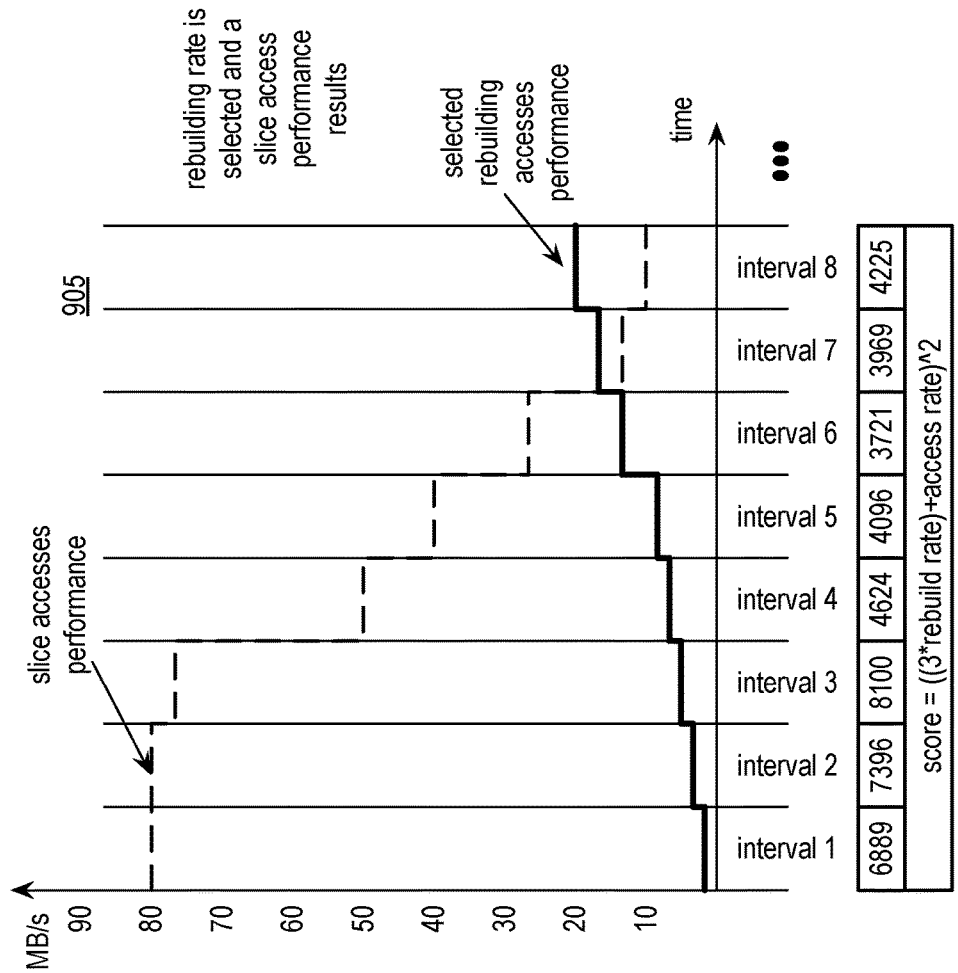
FIG. 9B is a timing diagram illustrating an example of access performance in accordance with the present invention.
Figure 9A:
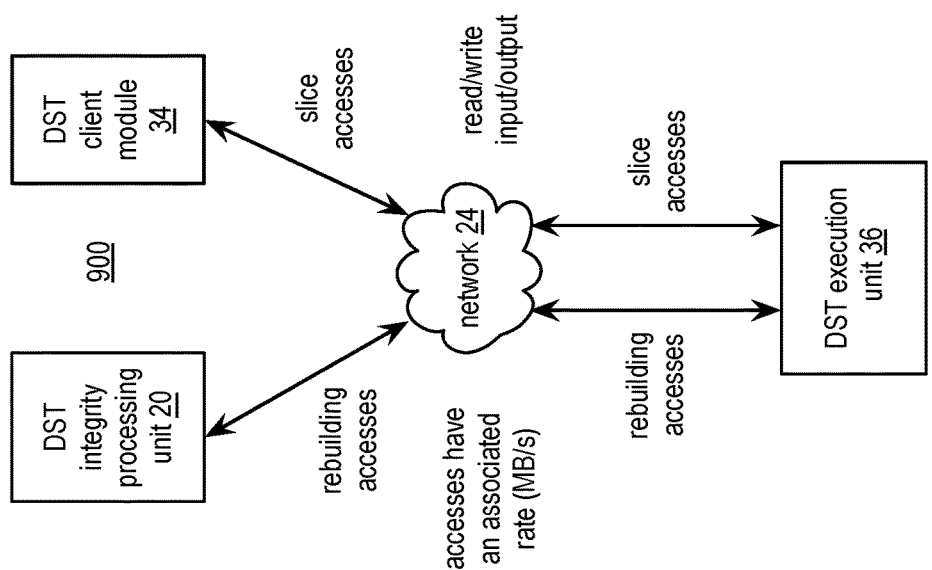
FIG. 9A is a schematic block diagram of another embodiment of a dispersed storage network (DSN) system in accordance with the present invention.

FIG. 9A is a schematic block diagram of another embodiment of a dispersed storage network (DSN) system 900 that includes the distributed storage and task (DST) integrity processing unit 20, the DST client module 34, the network 24, and the DST execution unit 36 of FIG. 1. Alternatively, the DST integrity processing unit 20 may be implemented as the DST execution unit 36. The DST client module 34 may be implemented as the user device 12 or the DST processing unit 16 of FIG. 1.

The DST integrity processing unit 20 issues rebuilding access requests via the network 24 to the DST execution unit 36 to facilitate rebuilding the one or more encoded data slices associated with a slice error. The rebuilding access requests include one or more of a list range request, a list digest of a range request, a read slice request, a write rebuilt slice request. Substantially simultaneously, the DST client module 34 issues slice access requests via the network 24 to the DST execution unit 36 with regards to accessing encoded data slices stored in the DST execution unit 36. The slice access requests include at least one of a read request, a write request, a delete request, and a list request. A rate of the rebuilding access requests may be associated with a controlled rate (e.g., by the DST integrity processing unit 20) of rebuilding encoded data slices based on a rate of detecting the slice errors. A rate of the slice access requests may be associated with a rate of accessing by a plurality of DSN users.

The DST execution unit 36 may be associated with an overall access rate to accommodate both the rebuilding access requests and the slice access requests. As such, the DST execution unit may accommodate more rebuilding access requests when there are fewer slice access requests or may accommodate more slice access requests when there are fewer rebuilding access requests. Accordingly, when the DST integrity processing unit 20 establishes the rate for the rebuilding access requests, a resulting rate of slice access requests may be realized (e.g., roughly as a difference between the overall access rate minus the established rate for the rebuilding access requests).

The DST integrity processing unit 20 determines the rate for the rebuilding access requests to achieve the desired rebuilding access request rate and a resulting acceptable rate of the slice access requests. As an example, the DST integrity processing unit 20 detects resulting slice access performance rates for a corresponding selected rebuilding access performance rates to produce scoring information. When adjusting the rate for the rebuilding access request, the DST integrity processing unit selects the rate for the rebuilding access requests based on a desired rate of slice access requests in accordance with the scoring information. From time to time, the DST integrity processing unit 20 updates the scoring information based on observed rates of slice access requests for corresponding selected rates for the rebuilding access requests. Such scoring information is discussed in greater detail with reference to FIG. 9B.

FIG. 9B is a timing diagram illustrating an example 905 of access performance that includes a graphical indication of resulting slice access performance levels (e.g. megabytes per second) for selected rebuilding access performance levels (e.g., megabytes per second) for a series of time intervals 1-8, and a resulting set of scores for the set of time intervals. The score may be generated based on a function of slice access performance rate and slice rebuilding access rate. For example, the score may be calculated in accordance with a scoring formula: score=((3*rebuild rate)+access rate)^2.

The rebuilding rate is the rate at which data may be rebuilt from slices by a processing device/system (data size/time). For a given selected rebuilding rate (e.g., 8 MB/s), an associated score may be subsequently updated in accordance with a learning rate function when an updated corresponding slice access rate is measured for the given selected rebuilding rate. For example, the associated score may be subsequently updated in accordance with a learning rate function formula of: updated score=(old score)*(1−learning rate)+ (new score*learning rate). For instance, updated score=81=80*(1−0.1)+(90*0.1), when the learning rate is 10%, the old score is 80, and the new score is 90.

Figure 9C:
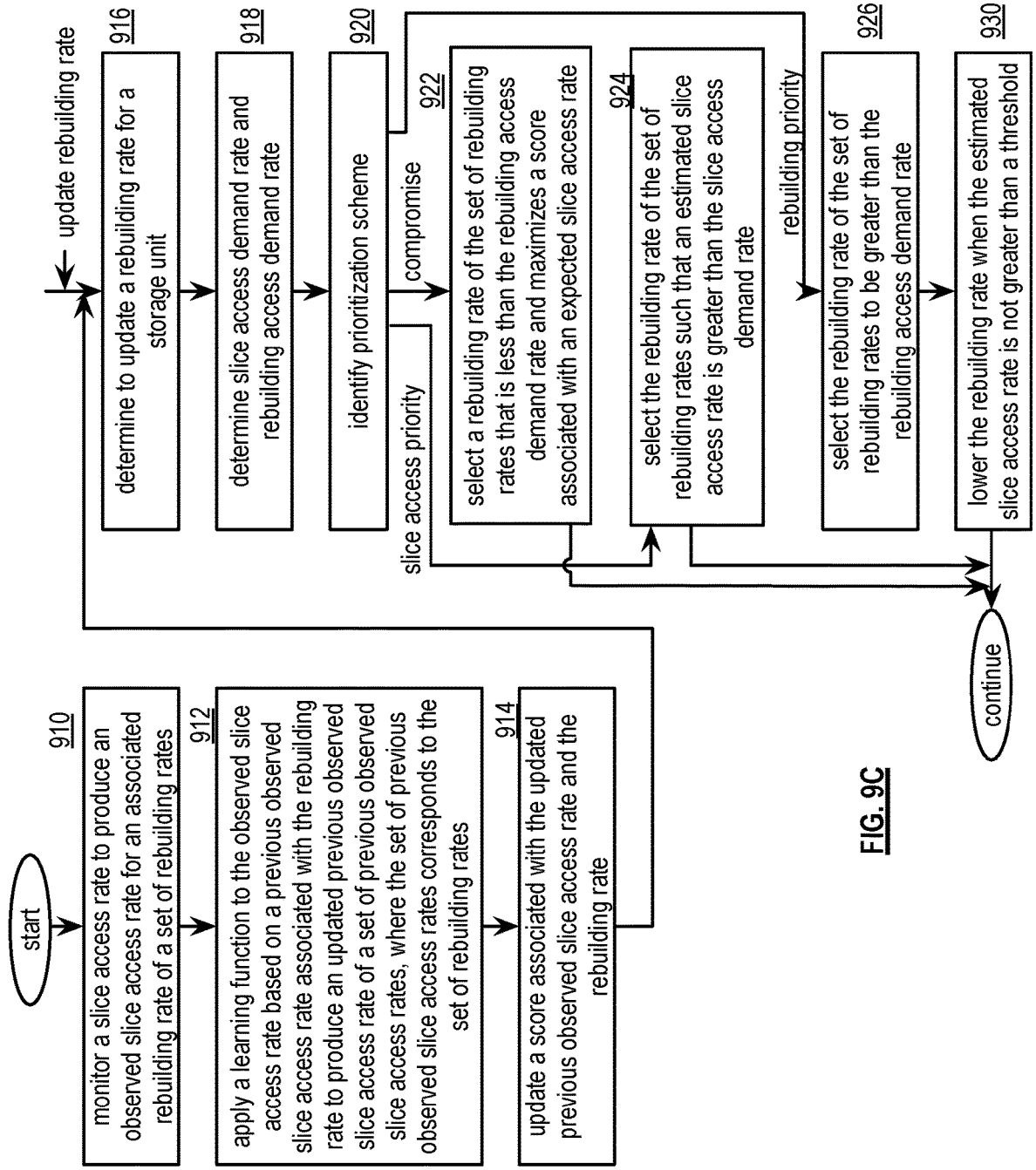
FIG. 9C is a flowchart illustrating an example of prioritizing access rates in accordance with the present invention.

FIG. 9C is a flowchart illustrating an example of prioritizing access rates. The method includes step 910 where a processing module (e.g., of a distributed storage and task (DST) integrity processing unit) monitors a slice access rate to produce an observed slice access rate for an associated rebuilding rate of a set of rebuilding rates. The monitoring includes at least one of performing a test, initiating a query, and receiving access rate information.

The method continues at step 912 where the processing module applies a learning function to the observed slice access rate based on a previous observed slice access rate associated with the rebuilding rate to produce an updated previous observed slice access rate of a set of previous observed slice access rates, where the set of previous observed slice access rates corresponds to the set of rebuilding rates. The method continues at step 914 where the processing module updates a score associated with the updated previous observed slice access rate and the rebuilding rate.

In an example of updating a rebuilding rate, the method continues at step 916 where the processing module determines to update the rebuilding rate for a storage unit. The determining may be based on one or more of detecting an end of a time interval, receiving a request, receiving an error message, and detecting an unfavorable slice access rate. The method continues at step 918 where the processing module determines slice access demand rate and rebuilding access demand rate. The determining may be based on one or more of interpreting a queue, receiving a request, and accessing a historical record.

The method continues at step 920 where the processing module identifies a prioritization scheme of one of a slice access priority scheme, a compromise scheme, and a rebuilding priory scheme. The identifying may be based on one or more of a predetermination, detecting that a demand rate is much greater than a demand threshold level, and receiving a request. For example, the processing module selects the slice access priority scheme when the slice access demand rate is much greater than the rebuilding access demand rate. As another example, the processing module selects the rebuilding priory scheme when the rebuilding access demand rate is much greater than the slice access demand rate. As yet another example, the processing module selects the compromise scheme when the slice access demand rate and the rebuilding access demand rate are similar.

When the processing module selects the compromise prioritization scheme, the method continues at step 922 where the processing module selects a rebuilding rate of the set of rebuilding rates that is less than the rebuilding access demand rate and maximizes a score associated with an expected slice access rate. The selecting may be based on one or more of accessing a table, accessing a record, and calculating the rebuilding rate. When the processing module selects the slice access priority scheme, the method continues at step 924 where the processing module selects the rebuilding rate of the set of rebuilding rates such that an estimated slice access rate is greater than the slice access demand rate. For example, the processing module selects the rebuilding rate from the scoring information such that the rebuilding rate is associated with a slice access rate that is greater than the slice demand rate. When the processing module selects the rebuilding priory scheme, the method continues at step 926 where the processing module selects the rebuilding rate of the set of rebuilding rates to be greater than the rebuilding access demand rate. For example, the processing module selects the rebuilding rate to be just greater than a rebuilding rate of the scoring information. The method continues at step 930 where the processing module lowers the rebuilding rate when the estimated slice access rate is not greater than a threshold. For example, the processing module determines the threshold based on a slice access demand rate and a minimum difference.

FIGS. 10A-B are diagrams illustrating examples 1000 and 1005 of modifying scoring information that includes scoring information at two time frames. The scoring information includes an association of values of a set of rebuilding rates (RR), a set of slice access rates (SAR), and a set of scores (SCR) (e.g., score=((3*rebuild rate)+slice access rate)^2). Initial scoring information is represented for a time frame 10 and updated scoring information is represented for a subsequent timeframe 11. The updating of the scoring information is updated in accordance with a score updating scheme.

In particular, FIG. 10A represents an example 1000 when the scoring updating scheme includes updating slice access rates and scores when an observed slice access rate is greater than a previous observed slice access rate for a given rebuilding rate. For example, for a rebuilding rate of 8 MB per second, the observed slice access rate is 79 for timeframe T 11 and the previous observed slice access rate is 40 MB per second at timeframe T 10. The entry for the slice access rate corresponding to the rebuilding rate of 8 MB per second is updated from 40 MB per second to 79 MB per second. Accordingly, the score is updated as well from 4,096 to 10,609. The slice access rate entries for rebuilding rates of 6 MB per second and 4 MB per second are also updated to 79 MB per second since corresponding slice access rates at timeframe T 10 were less than 79 MB per second. Accordingly, scores associated with the rebuilding rates of 4 MB per second and 6 MB per second of T 11 are updated.

FIG. 10B represents another example 1005 when the scoring updating scheme includes updating slice access rates and scores when the observed slice access rate is less than the previous observed slice access rate for the given rebuilding rate. For example, for a rebuilding rate of 6 MB per second, the observed slice access rate is 7 for timeframe T 11 and the previous observed slice access rate is 50 MB per second at timeframe T 10. The entry for the slice access rate corresponding to the rebuilding rate of 6 MB per second is updated from 50 MB per second to 7 MB per second. Accordingly, the score is updated as well from 4,624 to 625. The slice access rate entries for rebuilding rates of 8 MB per second, 12 MB per second, and 16 MB per second are also updated to 7 MB per second since corresponding slice access rates at timeframe T 10 were greater than 7 MB per second. Accordingly, scores associated with the rebuilding rates of 8 MB per second, 12 MB per second, and 16 MB per second of T 11 are updated. The method of operation is discussed in greater detail with reference to FIG. 10C.

FIG. 10C is a flowchart illustrating an example of updating scoring information, which includes similar steps to FIG. 9C. The method begins with step 1010 where a processing module (e.g., of a distributed storage and task (DST) integrity processing unit) monitors a slice access rate to produce an observed slice access rate for an associated rebuilding rate of a set of rebuilding rates and applies a learning function to the observed slice access rate to produce an updated previous observed slice access rate as shown in step 1012. When the updated observed slice access rate is greater than the previous observed slice access rate for the rebuilding rate, the method continues to step 1014 where the processing module updates any remaining previous observed slice access rates that are lower than the updated previous observed slice access rate and are associated with another rebuilding rate that is less than the rebuilding rate (e.g., FIG. 10A example). When the updated observed slice access rate is less than the previous observed slice access rate for the rebuilding rate, the method continues at the step 1016 where the processing module updates any remaining previous observed slice access rates that are greater than the updated previous observed slice access rate and are associated with another rebuilding rate that is greater than the rebuilding rate (e.g., FIG. 10B example). The method continues at step 1018 where the processing module updates a score associated with the updated previous observed slice access rate.

FIG. 11A is a diagram illustrating another example 1100 of modifying scoring information that includes scoring information at three time frames. The scoring information includes an association of values of a set of rebuilding rates (RR), a set of slice access rates (SAR), and a set of scores (SCR). Initial scoring information is represented for a time frame T 20 and updated scoring information is represented for subsequent timeframes T 21 and T 22. The updating of the scoring information is updated in accordance with a score updating scheme, where a formula to generate the score may be updated for each timeframe based on rebuilding activity. The rebuilding activity may include scanning storage of encoded data slices to detect one or more storage errors associated with the encoded data slices. A measure of rebuilding activity includes identifying when a particular DSN address range associated with the encoded data slices has been scanned for slice errors. Periodic scanning for errors may be desired to quickly identify and resolve slice errors. As time goes on, and a particular DSN address range has not been scanned for errors, the formula to generate the score may be updated to facilitate a timelier scanning for slice errors.

In particular, the scoring information at timeframe T 20 may include generating the scores using a formula of: score=((rebuild rate)^2.5+(slice access rate)^2.5). As such, similar priority is given to both rebuilding (e.g., scanning) and slice access for routine reads and writes of data. As time goes on, and the particular DSN address range has not been scanned, the scoring formula may be updated to a formula of: score=((rebuild rate)^3+(slice access rate)^2). As such, for higher priority is associated with rebuilding and lower priority is associated with slice access for the routine reads and writes of the data. As time goes on, and the particular DSN address range has not been scanned, the scoring formula may be further updated to a formula of: score= ((rebuild rate)^3.5+(slice access rate)^1.5). As such, an even higher priority is associated with rebuilding and an even lower priority is associated with slice access for the routine reads and writes of the data. Once the particular DSN address range has been scanned, the scoring formula may be returned back to the initial formula: score=((rebuild rate)^2.5+(slice access rate)^2.5) when the similar priority is desired. The method of operation is discussed in greater detail with reference to FIG. 11B.

FIG. 11B is a flowchart illustrating another example of updating scoring information, which includes similar steps to FIG. 9C. The method includes step 1110 where a processing module (e.g., of a distributed storage and task (DST) integrity processing unit) determines to update scoring information that includes a set of rebuilding rates, a set of slice access rates, and a corresponding set of scores. The determining may be based on one or more of a time frame has elapsed since a last update, interpreting a schedule, receiving an error message, and detecting that a rate of rebuilding is less than a desired rate of rebuilding (e.g., rebuilding is falling behind).

The method continues at step 1112 where the processing module determines whether a dispersed storage network (DSN) address range associated with the scoring information has been scanned since a last scoring information update. The determining may be based on one or more of receiving an error message, interpreting a schedule, initiating a query, and receiving a query response. When the processing module determines that the DSN address range associated with the scoring information has not been scanned since the last scoring information update, the method branches to step 1116 where the processing module biases for rebuilding. When the processing module determines that the DSN address range associated with the scoring information has been scanned since the last scoring information update, the method continues to step 1114. The method continues at step 1114 where the processing module uses defaults for an updating scoring function. For example, the processing module resets exponents on rebuilding rate and on slice access rate to defaults within a scoring formula. The method branches to step 1118 where the processing module updates the set of scores.

When the processing module determines that the DSN address range associated with the scoring information has not been scanned since the last scoring information update, the method continues at step 1116 where the processing module biases the rebuilding in the updated scoring function. For example, the processing module raises an exponent on the rebuilding rate and lowers the exponent on the slice access rate of the scoring formula.

The method continues at step 1118 where the processing module updates a set of scores based on the updated scoring function. For example, the processing module calculates the scoring formula on the set of scores using the updated scoring function. The method continues with steps 1120, 1122 and 1124, which are similar to steps 916, 918 and 922 of FIG. 9C where the processing module determines to update a rebuilding rate for a storage unit, determine slice access demand rate and rebuilding access demand rate, and selects a rebuilding rate of the set of rebuilding rates that is less than the rebuilding access demand rate and maximizes a score associated with an expected slice access rate.

FIG. 12A is a diagram of another example of updating scoring information that includes scoring information at three time frames. The scoring information includes an association of values of a set of rebuilding rates (RR), a set of input/output rates (TO), and a set of scores (SCR) (e.g., score=((3*rebuild rate)+slice access rate)^2). In one embodiment, the IO rate refers to the rate at which encoded data slices are accessed at a storage unit for read/write operations. In another embodiment, the set of IO rates includes the slice access rates (e.g., write/read operations) plus other DSN processing rates (e.g., rebuilding rates) for a set of storage units. Initial scoring information is represented for a time frame T 10 and updated scoring information is represented for subsequent timeframes T 11 and T 12. The updating of the scoring information is updated in accordance with a score updating scheme.

In an example 1200, the scoring updating scheme includes updating IO rates and scores when an IO rate is greater than a threshold difference (e.g., more than, less than) an initial IO rate for a given rebuilding rate. In this example, a threshold difference is 3 MB/s for a rebuilding rate of 8 MB per second, the IO rate is 79 for timeframe T 11 and the initial IO rate is 40 MB per second at timeframe T 10. As the threshold difference is exceeded (e.g., 79−40=39>3), the entry for the IO rate corresponding to the rebuilding rate of 8 MB per second is updated from 40 MB per second to 79 MB per second. Accordingly, the score is updated as well from 4,096 to 10,609. The IO rate entries for each rebuilding rate of the set of rebuilding rates are also updated (along with their corresponding scores) according to one or more learning rate functions.

For example, the plurality of IO rates may all be updated according to a learning rate function of: updated IO rate= (initial IO rate)*(1−learning rate)+(IO rate*learning rate). In this example, the plurality of IO rates correspond to a set of storage units. Note the plurality of IO rates for the set may be based on a lowest IO rate of a storage unit of the set of storage units, an average IO rate of the set of storage units, a mean IO rate, etc.).

As another example, each IO rate may be updated according to a different learning rate function. For example, a first learning rate function may be applied to storage units storing a decode threshold number of encoded data slices of a set of encoded data slices and a second learning rate function may be applied to storage units storing a redundancy number of encoded data slices of the set of encoded data slices. By utilizing separate learning rate functions, the score for the decode threshold may be weighted so that storage units storing the decode threshold number of encoded data slices will give higher priority to the rebuilding than storage units storing the redundancy number of encoded data slices. The method of operation is discussed in greater detail with reference to FIG. 12B.

FIG. 12B is a flowchart illustrating another example of updating scoring information. The method begins at step 1200, where a computing device of a dispersed storage network (DSN) obtains scoring information for a rebuilding for one or more storage units of a set of storage units of the DSN. The scoring information includes a plurality of rebuilding rates, a plurality of input/output rates, a plurality of scores, and a plurality of selection rates. In one embodiment, the term selection rate refers to historic use of a particular rebuilding rate for a set of storage units. Note the plurality of input/output rates may correspond to a set of storage units or to a storage unit of the set of storage units. Further note that at a previous time, the computing device calculates an initial input/output rate for each rebuilding rate of the plurality of rebuilding rates to produce the plurality of initial input/output rates.

The method continues with step 1202, where the computing device determines, based on the scoring information, that a first input/output rate of the plurality of input/output rates for a first rebuilding rate of the plurality of rebuilding rates exceeds a difference threshold compared to an initial first input/output rate for the first rebuilding rate. Note the initial first input/output rate has a corresponding first score and a first selection rate (e.g., historical data (e.g., percentage of time the first rebuilding rate has been implemented for a first storage unit)). As one example, the difference threshold may indicate to change one or more input/output rates when the initial first input/output rate is exceeded by the first input/output rate by 10%. As another example, the difference threshold may indicate to change one or more input/output rates when the initial first input/output rate is exceeded (e.g., greater than, less than) by the first input/output rate by 2 MB/s. As yet another example, the difference threshold may indicate to change one or more input/output rates when the initial first input/output rate is exceeded by the first input/output rate by any amount.

The method continues with step 1204, where the computing device adjusts the plurality of initial input/output rates based on the first input/output rate to produce a plurality of updated input/output rates. For example, the computing device may apply a learning rate function to the plurality of initial input/output rates and the plurality of input/output rates to produce the plurality of updated input/output rates. As another example, the computing device may apply a first learning rate function for the first rebuilding rate to a first input/output rate of the plurality of initial input/output rates to produce a first updated input/output rate of the plurality of updated input/output rates and may apply a second learning rate function for a second rebuilding rate to a second input/output rate of the plurality of initial input/output rates to produce a second updated input/output rate of the plurality of updated input/output rates.

The method continues with step 1206, where the computing device generates an updated plurality of scores for the plurality of rebuilding rates based on the plurality of updated input/output rate. The method continues with step 1208, where the computing device implements the rebuilding in accordance with the updated plurality of scores. Note a DS processing unit may determine to use a highest score for the rebuilding or may determine to use a rebuild rate without the highest score when an importance of data factor outweighs the highest score. For example, for critical data in time T12, the DS processing unit may choose a rebuild rate of 8 MB/s (score of 10609) instead of rebuild rate of 2 MB/s (score of 15876) to rebuild critical data. The importance of data factor may also include determining the set of storage units may maintain estimated future TO operations with the higher rebuilding rate.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure)

or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more computing devices of a storage network comprises:
    obtaining performance impact information regarding a data reconstruction operation associated with a computing device of the one or more computing devices, wherein the data reconstruction operation is regarding reconstructing data at a first reconstruction rate of a plurality of reconstruction rates, and wherein the performance impact information includes performance metrics of the storage network affected by the data reconstruction operation, wherein the data is error encoded into a plurality of sets of encoded data slices, and wherein the first reconstruction rate is based on a rate of detecting errors with at least some encoded data slices of the plurality of sets of encoded data slices;
    determining a second reconstruction rate of the plurality of reconstruction rates to utilize for the data reconstruction operation based on the performance impact information to achieve a first performance metric of the performance metrics; and
    executing the data reconstruction operation in accordance with the second reconstruction rate.

2. The method of claim 1, wherein the performance impact information comprises an input/output speed of the computing device.

3. The method of claim 1, wherein the performance impact information comprises a bandwidth of the computing device.

4. The method of claim 1, wherein the performance impact information comprises a score based on a slice access rate of the computing device and a reconstruction rate of the plurality of reconstruction rates.

5. The method of claim 1, wherein the performance impact information comprises a slice access rate of the computing device regarding encoded data slices, wherein the plurality of sets of encoded data slices include the encoded data slices.

6. The method of claim 5, wherein the slice access rate is regarding a write request or a read request.

7. The method of claim 1, wherein the performance metrics comprises an input/output rate of a set of storage units of the storage network that are associated with the data reconstruction operation.

8. The method of claim 1, wherein the performance metrics comprises a historical use of a particular reconstruction rate of the plurality of reconstruction rates.

9. The method of claim 1, wherein the performance metrics comprises a slice access rate for the computing device.

10. The method of claim 1, wherein the data is error encoding is in accordance with dispersed storage error encoding parameters.

11. The method of claim 1, wherein the determining the second reconstruction rate of the plurality of reconstruction rates to utilize for the data reconstruction operation further comprises a prioritization scheme.

12. The method of claim 11, wherein the prioritization scheme comprises a slice access priority scheme.

13. The method of claim 12 further comprises:
determining a reconstruction access demand rate;
determining a slice access demand rate; and
when the slice access demand rate exceeds the reconstruction access demand rate by a threshold difference, determining the prioritization scheme is the slice access priority scheme.

14. The method of claim 13 further comprises:
selecting the second reconstruction rate of the plurality of reconstruction rates such that an estimated slice access rate is greater than the slice access demand rate.

15. The method of claim 11, wherein the prioritization scheme comprises a reconstruction priority scheme.

16. The method of claim 15 further comprises:
determining a reconstruction access demand rate;
determining a slice access demand rate; and
when the reconstruction access demand rate exceeds the slice access demand rate by a threshold difference, determining the prioritization scheme is the reconstruction priority scheme.

17. The method of claim 16 further comprises:
selecting the second reconstruction rate of the plurality of reconstruction rates to be greater than the reconstruction access demand rate.

18. The method of claim 11, wherein the prioritization scheme comprises a compromise priority scheme.

19. The method of claim 18 further comprises:
determining a reconstruction access demand rate;
determining a slice access demand rate; and
when the reconstruction access demand rate is within a threshold difference of the slice access demand rate, determining the prioritization scheme is the compromise priority scheme.

20. The method of claim 19 further comprises:
selecting the second reconstruction rate of the plurality of reconstruction rates that is less than the reconstruction access demand rate and maximizes a score associated with an expected slice access rate.

* * * * *